United States Patent
Katayama

(10) Patent No.: US 10,223,032 B2
(45) Date of Patent: *Mar. 5, 2019

(54) QUEUE CONTROL FOR SHARED MEMORY ACCESS

(71) Applicant: INTERNATIONAL BUSINESS MACHINES CORPORATION, Armonk, NY (US)

(72) Inventor: Yasunao Katayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/581,729

(22) Filed: Apr. 28, 2017

(65) Prior Publication Data

US 2018/0314462 A1 Nov. 1, 2018

(51) Int. Cl.
*G06F 3/06* (2006.01)
*G06F 9/38* (2018.01)

(52) U.S. Cl.
CPC ........... *G06F 3/0659* (2013.01); *G06F 3/061* (2013.01); *G06F 3/067* (2013.01); *G06F 3/0683* (2013.01); *G06F 9/3855* (2013.01)

(58) Field of Classification Search
None
See application file for complete search history.

(56) References Cited

U.S. PATENT DOCUMENTS

| | | | | |
|---|---|---|---|---|
| 5,649,157 | A * | 7/1997 | Williams | G06F 13/18 710/39 |
| 6,832,279 | B1 * | 12/2004 | Potter | G06F 13/405 710/112 |
| 7,884,782 | B2 | 2/2011 | Lee et al. | |
| 8,271,730 | B2 | 9/2012 | Piry et al. | |
| 9,208,002 | B2 | 12/2015 | Matsuo et al. | |

(Continued)

OTHER PUBLICATIONS

Schoinas, et al.,"Fine-grain Access Control for Distributed Shared Memory",ASPLOS VI Proceedings of the Sixth International Conference on Architectural Support for Programming Languages and Operating Systems, Oct. 1994, pp. 297-306.

(Continued)

*Primary Examiner* — Kaushikkumar M Patel
(74) *Attorney, Agent, or Firm* — Tutunjian & Bitetto, P.C.; Vazken Alexanian

(57) ABSTRACT

A memory controller is provided for accessing shared memory objects by read and write requests made to a memory. The memory controller includes a list for registering address locations of the shared objects in the memory, and having slots for a lock bit. The memory controller includes a read wait queue and a write wait queue for selectively inputting, outputting, holding, and purging requests. The memory controller includes a read initiated queue and a write initiated queue for selectively inputting and purging requests transferred from the read wait queue and the write wait queue, respectively, upon memory access initiation and completion. The memory controller includes a controller for controlling the wait queues using policies by determining which requests to output, hold, and purge, based on a list entry, a lock bit and TTL information set to each request upon a hold being applied thereto and decremented in each cycle.

7 Claims, 10 Drawing Sheets

(56) References Cited

U.S. PATENT DOCUMENTS

| | | |
|---|---|---|
| 9,229,885 B2 | 1/2016 | Chakraborty et al. |
| 2006/0069882 A1* | 3/2006 | Wheeler ............. G06F 13/1642 |
| | | 711/151 |
| 2006/0230411 A1* | 10/2006 | Richter ................... G06F 9/526 |
| | | 719/328 |
| 2008/0307431 A1* | 12/2008 | Hwang ..................... G06F 9/52 |
| | | 719/314 |
| 2009/0228663 A1 | 9/2009 | Ichino |
| 2014/0013027 A1* | 1/2014 | Jannyavula Venkata .................... |
| | | G06F 12/0866 |
| | | 711/103 |
| 2014/0289483 A1 | 9/2014 | Hosoda et al. |
| 2017/0293578 A1* | 10/2017 | Hower ................ G06F 12/0811 |
| 2017/0315914 A1* | 11/2017 | Muralinnanohar ......................... |
| | | G06F 12/0804 |
| 2018/0234503 A1* | 8/2018 | Lan ....................... G06F 15/177 |

OTHER PUBLICATIONS

Zhang, et al., "Queue-Based and Adaptive Lock Algorithms for Scalable Resource Allocation on Shared-Memory Multiprocessors", Int J Parallel Prog, Springer Science and Business Media, Aug. 2014, 31 pages.

* cited by examiner

| General information portion (RW, address, etc.) 410 | Source information portion (source address, etc.) 420 | Time information portion (TTL, etc.) 430 |

QUEUE CONTROL FOR SHARED MEMORY ACCESS

BACKGROUND

Technical Field

The present invention relates generally to memories and, in particular, to queue control for shared memory access.

Description of the Related Art

The efficient control of multiple accesses for shared objects from processes and threads is one of the critical challenges in parallel computing systems. The use of cache on a processor side has been adopted in various systems and provides efficient controls within each cache coherent domain. However, remote memory accesses to the shared objects from outside of the cache coherent domain often become the critical paths in scaling out the system, in particular for sparse workloads. Thus, there is a need for an improved approach for shared memory access.

SUMMARY

According to an aspect of the present invention, a memory controller is provided for accessing shared memory objects from local and remote locations by read requests and write requests made to a memory. The memory controller includes a lock address list configured to register address locations of the shared memory objects in the memory, and having a plurality of slots each associated with a lock bit. The memory controller further includes a read wait queue and a write wait queue configured to selectively input, output, hold, and purge the requests from processor cores and network inputs and outputs. The memory controller also includes a read initiated queue and a write initiated queue configured to selectively input and purge the requests transferred from the read wait queue and the write wait queue, respectively, upon initiation and completion of corresponding accesses to the memory. The memory controller additionally includes a queue controller configured to control the wait queues using policies by determining which of the requests to output, which of the requests to hold, and which of the requests to purge, based on an entry of the lock address list, a status of a corresponding lock bit and Time To Live information set to each of the requests upon a hold being applied thereto and decremented in each cycle.

According to another aspect of the present invention, a computer-implemented method is provided for accessing shared memory objects from local and remote locations by read requests and write requests made to a memory. The method includes configuring a lock address list, having a plurality of slots each associated with a lock bit, to register address locations of the shared memory objects in the memory. The method further includes configuring a read wait queue and a write wait queue to selectively input, output, hold, and purge the requests from processor cores and network inputs and outputs. The method also includes configuring a read initiated queue and a write initiated queue to selectively input and purge the requests transferred from the read wait queue and the write wait queue, respectively, upon initiation and completion of corresponding accesses to the memory. The method additionally includes configuring a queue controller to control the wait queues using policies by determining which of the requests to output, which of the requests to hold, and which of the requests to purge, based on an entry of the lock address list, a status of a corresponding lock bit and Time To Live information set to each of the requests upon a hold being applied thereto and decremented in each cycle.

According to yet another aspect of the present invention, a computer processing system is provided. The computer processing system includes a processor. The computer processing system further includes a non-volatile memory. The computer processing system also includes a memory controller for accessing shared memory objects from local and remote locations by read requests and write requests made to the non-volatile memory. The memory controller includes a lock address list configured to register address locations of the shared memory objects in the non-volatile memory, and having a plurality of slots each associated with a lock bit. The memory controller further includes a read wait queue and a write wait queue configured to selectively input, output, hold, and purge the requests from processor cores and network inputs and outputs. The memory controller also includes a read initiated queue and a write initiated queue configured to selectively input and purge the requests transferred from the read wait queue and the write wait queue, respectively, upon initiation and completion of corresponding accesses to the non-volatile memory. The memory controller additionally includes a queue controller configured to control the wait queues using policies by determining which of the requests to output, which of the requests to hold, and which of the requests to purge, based on an entry of the lock address list, a status of a corresponding lock bit and Time To Live information set to each of the requests upon a hold being applied thereto and decremented in each cycle.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 4 shows an exemplary entry in the queues of FIG. 3, in accordance with an embodiment of the present invention;

DETAILED DESCRIPTION

The present invention is directed to queue control for shared memory access.

In an embodiment, the present invention provides a queue configuration and control strategy that allows for improved exclusive controls of accesses to shared memory, by keeping the requests in multiple (wait, initiated, reserved) read/write queues and autonomously purging in each queue using Time To Live (TTL) and other controls, in order to avoid stalls even when the memory requests to the shared objects do not arrive immediately as expected.

Figure 1:
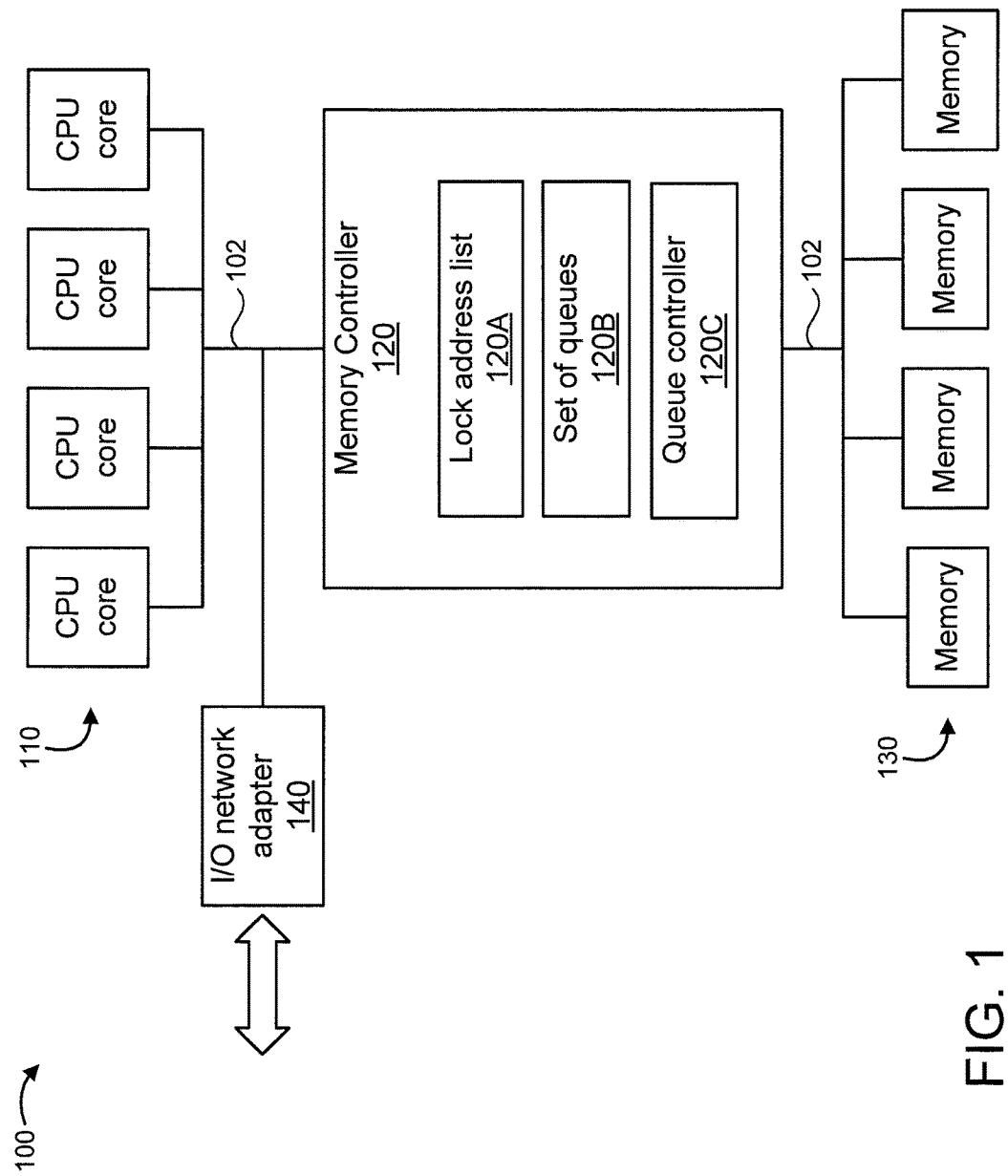
FIG. 1 shows an exemplary processing system to which the present invention may be applied, in accordance with an embodiment of the present invention.

FIG. 1 shows an exemplary processing system 100 to which the present invention may be applied, in accordance with an embodiment of the present invention.

The processing system 100 includes a set of CPU cores 110, a memory controller 120, a set of memories 130, and an Input/Output (I/O) network adapter 140. The preceding elements can be connected using one or more buses, collectively denoted by the figure reference numeral 102.

The memory controller 120 can include a lock address list 120A, a set of queues 120B, and a queue controller 120C. The set of queues 120B can include a read wait queue, a write wait queue, a read initiated queue, a write initiated queue, and a read reserved queue. The preceding elements are further described herein below.

Figure 2:
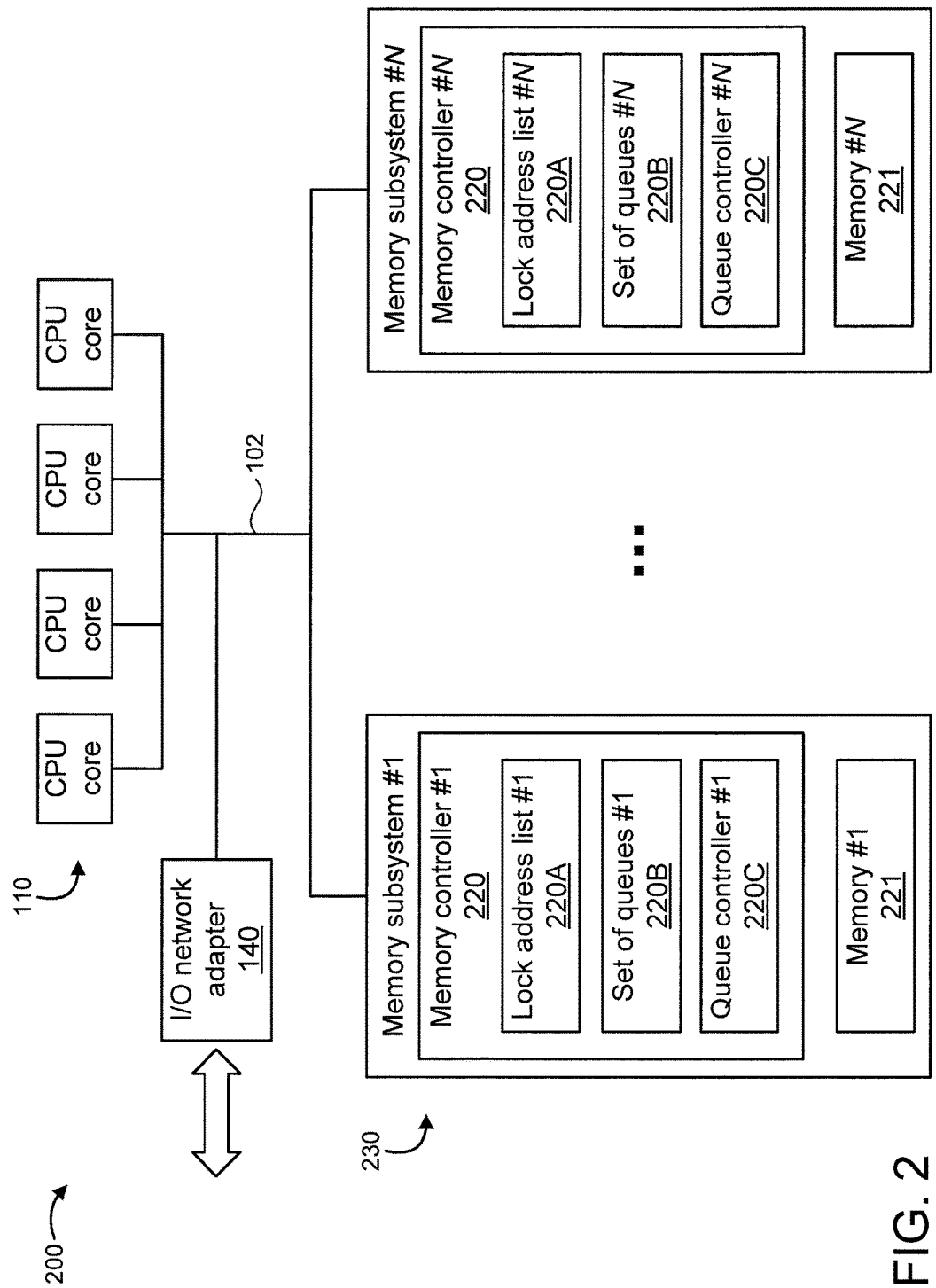
FIG. 2 shows another exemplary processing system to which the invention principles may be applied, in accordance with an embodiment of the present invention.

FIG. 2 shows another exemplary processing system 200 to which the invention principles may be applied, in accordance with an embodiment of the present invention. The processing system 200 is similar to processing system 100 of FIG. 1. Accordingly, only differences between processing system 200 and processing system 100 will now be described.

The processing system 200 includes a memory subsystem 230 that includes multiple memory subsystems #1 through #N. Each of the memory subsystems #1 through #N includes a respective memory controller 220 (that, in turn, includes a respective lock address list 220A, a respective set of queues 220B, and a respective queue controller 220C) as well as a respective memory 221. Memory #1 through #N can be memories of different technologies and thus memory controller #1 through #N and their components can be of different designs, as readily appreciated by one ordinary skill in the art.

Figure 3:
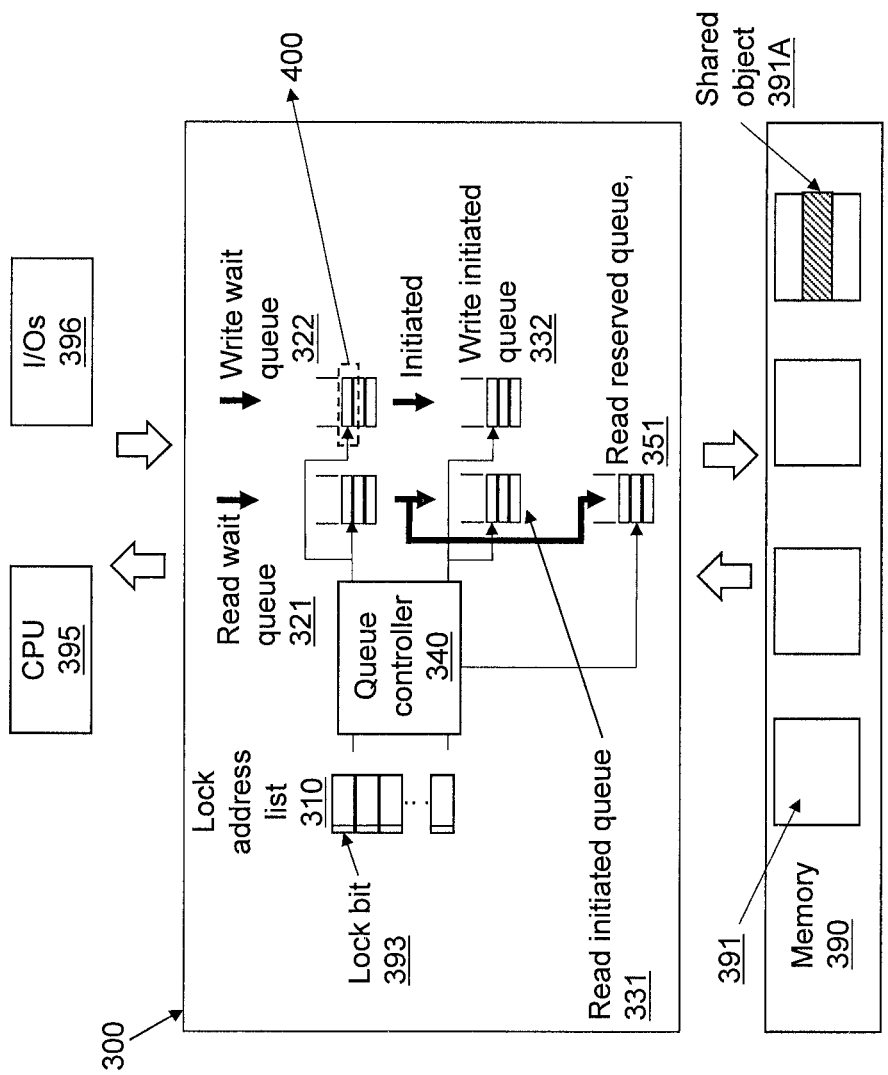
FIG. 3 shows an exemplary memory controller for accessing shared memory objects from local and remote locations via read requests and write requests made to a memory, in accordance with an embodiment of the present invention.

FIG. 3 shows an exemplary memory controller 300 for accessing shared memory objects from local and remote locations via read requests and write requests made to a memory, in accordance with an embodiment of the present invention. In an embodiment, memory controller 300 can be, for example, memory controller 120 of FIG. 1 or memory controller 220 of FIG. 2.

In an embodiment, the present invention exploits information included in an ordinary read or an ordinary write request in order to notify of a memory error.

In an embodiment, "Time To Live" (TTL) information is added to time information when a hold is initiated, and the TTL information is decremented in each cycle.

The memory controller 300 includes a lock address list 310, a read wait queue 321, a write wait queue 322, a read initiated queue 331, a write initiated queue 332, a queue controller 340. The memory controller 300 controls a memory 390 having objects (hereinafter interchangeably "memory objects") 391 stored therein, including shared objects (hereinafter "shared memory objects") 391A. The memory controller 300 can further include a read reserved queue 351.

The lock address list 310 is configured to register address locations of the shared memory objects 391A in the memory 390, and having a plurality of slots each associated with a lock bit 393.

The read wait queue 321 and the write wait queue 322 are configured to selectively input, output, hold, and purge the requests from processor cores 395 and network Input/Outputs (I/Os) 396. In an embodiment, holding a request involves setting Time To Live (TTL) information for the request being held, and decrementing the TTL information in each cycle. In an embodiment, a timeout corresponds to a TTL value being less than or equal to zero. An exemplary entry 400 in the read wait queue 321 and/or the write wait queue 322 is shown in FIG. 4.

The read initiated queue 331 and a write initiated queue 332 are configured to selectively input and (successfully or unsuccessfully) purge the requests transferred from the read wait queue 321 and the write wait queue 322, respectively, upon initiation and completion of the corresponding accesses to the memory 390.

The read reserved queue 351 is configured to operate as an extra queue that can selectively input, hold, and purge the requests transferred from the read initiated queue 331 upon the completion of the shared memory read accesses and hold or purge based on the following write requests and Time To Live information attached to each request upon a hold and decremented in each cycle.

The queue controller 340 is configured to control the wait queues 321 and 322, the initiated queues 331 and 332, and the read reserved queue 351 using policies by determining which of the requests to output, which of the requests to hold, and which of the requests to purge, based on an entry of the lock address list 310, a status of a corresponding lock bit and Time To Live information set to each of the requests upon a hold being applied thereto and decremented in each cycle.

FIG. 4 shows an exemplary entry 400 in the queues 322 of FIG. 3, in accordance with an embodiment of the present invention.

The entry 400 includes a general information portion 410, a source information portion 420, and a time information portion 430. The general information portion 410 can include a Read Write (RW), a memory address, and so forth. The source information portion 420 can include information relating to a source of a request involving a memory access such as, but not limited to, a source identifier (e.g., a source address), and so forth. The time information 430 can include Time To Live (TTL) information, and so forth. The TTL information is used (set) when a hold is applied to a request and is decremented in each cycle.

Figure 5:
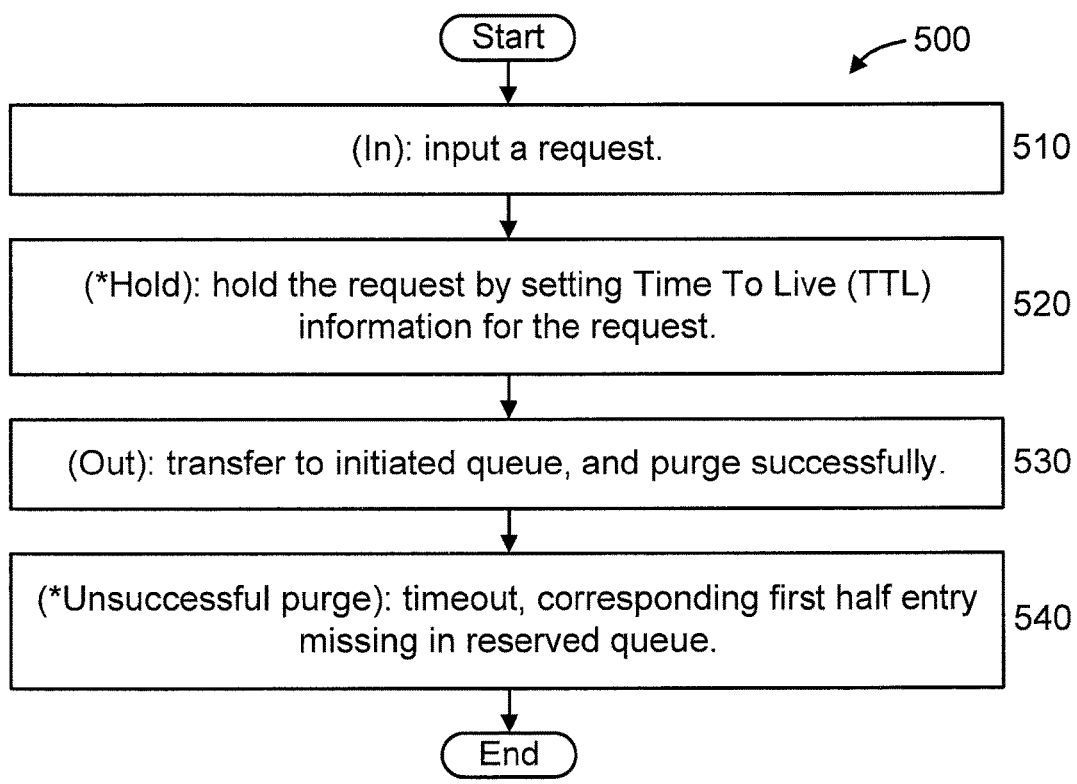
FIG. 5 shows an exemplary method for queue control relating to the wait queues of FIG. 3, in accordance with an embodiment of the present invention.

FIG. 5 shows an exemplary method 500 for queue control (wait) relating to the wait queues (read wait queue 321 and read wait queue 322) of FIG. 3, in accordance with an embodiment of the present invention. Operations unique to a lock address hit being shown preceded by an asterisk (*).

At step 510, (In): input a request.

At step 520 (*Hold): hold the request by setting Time To Live (TTL) information for the request.

At step 530 (Out): transfer to initiated queue, and purge successfully.

At step 540, (*Unsuccessful purge): timeout, corresponding first half entry missing in reserved queue.

Figure 6:
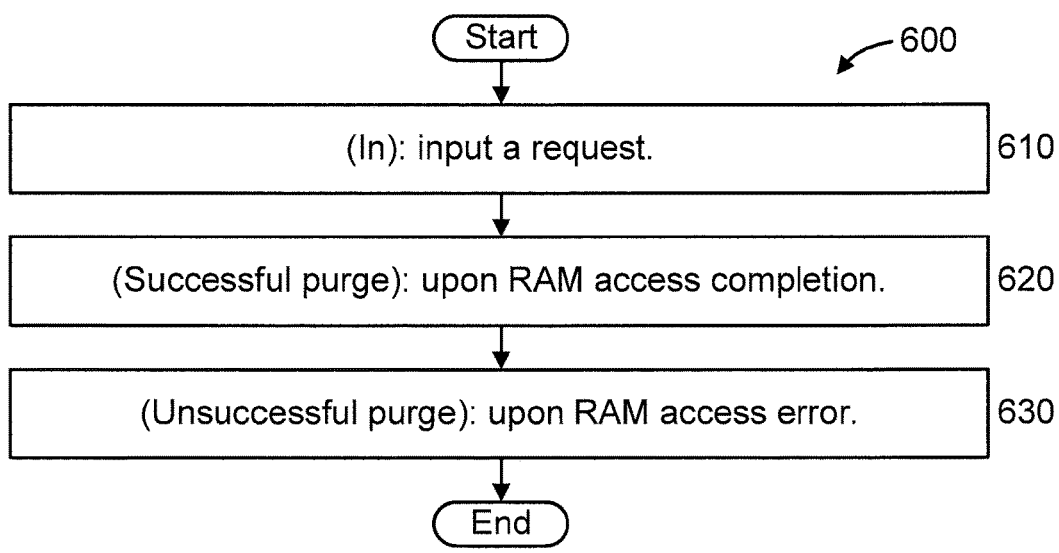
FIG. 6 shows an exemplary method for queue control relating to the initiated queues of FIG. 3, in accordance with an embodiment of the present invention.

FIG. 6 shows an exemplary method 600 for queue control (initiated) relating to the initiated queues (read initiated queue 331 and write initiated queue 332) of FIG. 3, in accordance with an embodiment of the present invention.

At step 610, (In): input a request.

At step 620, (Successful purge): upon RAM access completion.

At step 630, (Unsuccessful purge): upon RAM access error.

Figure 7:
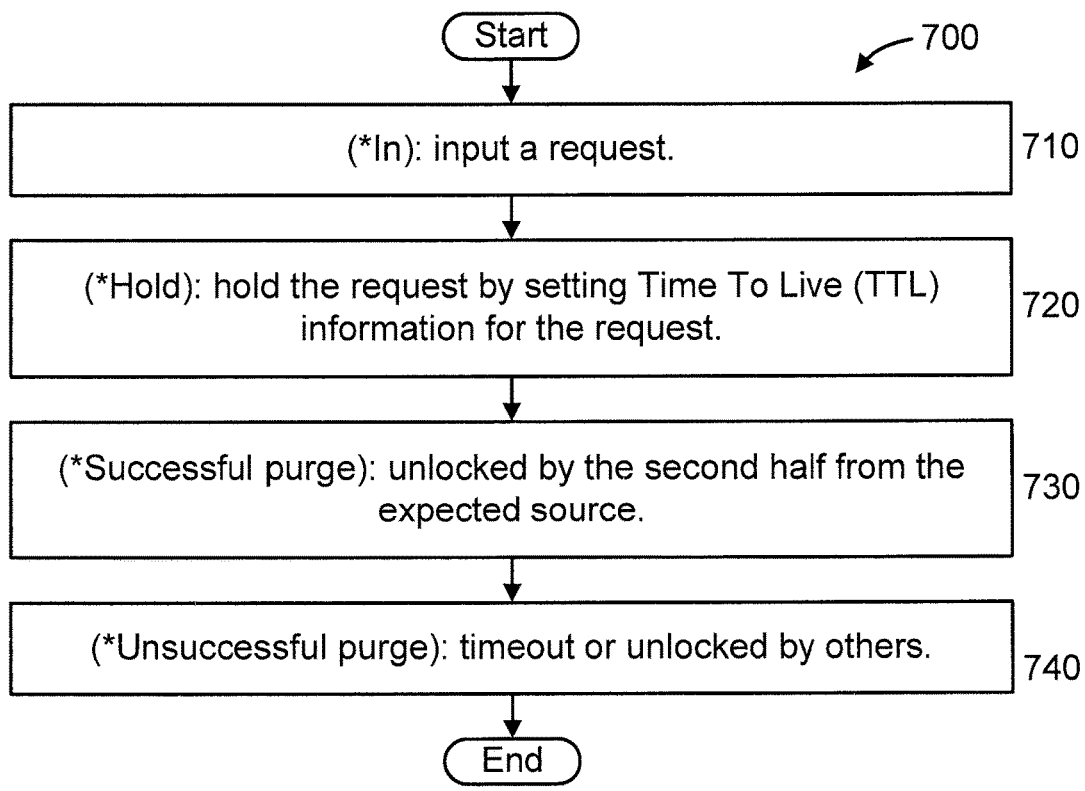
FIG. 7 shows an exemplary method for a queue control relating to the read reserved queue of FIG. 3, in accordance with an embodiment of the present invention.

FIG. 7 shows an exemplary method 700 for a queue control (reserved, special queue for the first half accesses in lock address list only) relating to the read reserved queue 351 of FIG. 3, in accordance with an embodiment of the present invention. Operations unique to a lock address hit being shown preceded by an asterisk (*).

At step 710, (*In): input a request.

At step 720, (*Hold): hold the request by setting Time To Live information for the request.

At step 730, (*Successful purge): unlocked by the second half from the expected source).

At step 740, (*Unsuccessful purge): timeout or unlocked by others.

Figure 8:
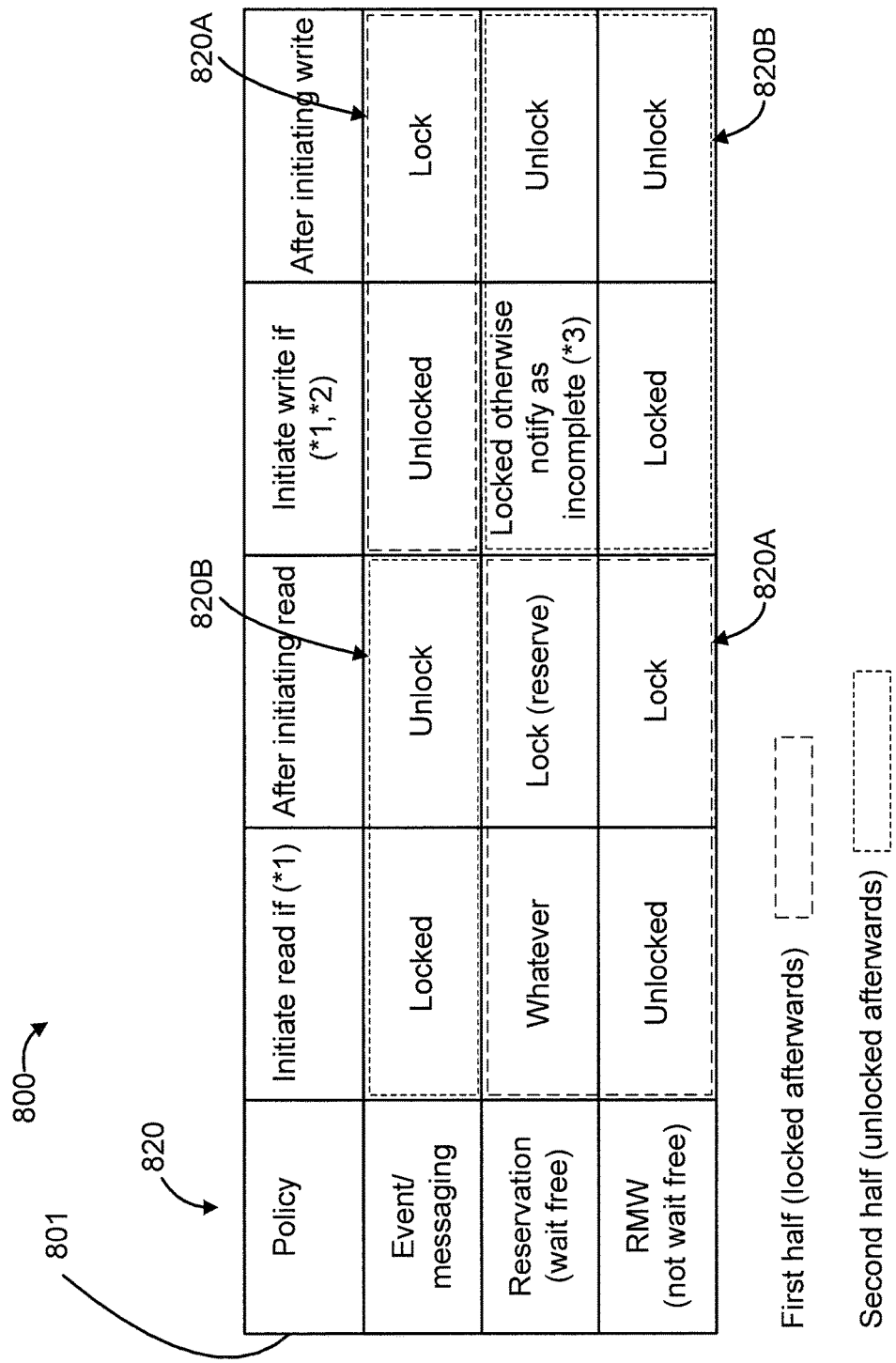
FIG. 8 shows a table of specific wait queue controls for various policies, in accordance with an embodiment of the present invention.

FIG. 8 shows a table 801 of specific wait queue controls 800 for various policies 820, in accordance with an embodiment of the present invention.

The types of memory accesses in the lock address list 310 include event/messaging 841, reservation (wait free) 822, and Read-Modify-Write (RMW) (not wait free) 823.

The policies 820 include polices 820A for a first half (locked afterwards) of a memory access pair (RW) and policies 820B for a second half (unlocked afterwards) of a memory access pair (RW).

The following applies regarding the wait queue controls 800 (operations unique to a lock address hit being shown preceded by an asterisk (*):

*1: Lock address hit queue entries are on hold if not initiated.

*2: The second half writes are initiated only when the corresponding first half reads are in the reserved queue.

*3: Notify the source of a memory error (and let software to handle the rest) and purge the entry.

If an on-hold entry times out, purge the entry and notify the source of a memory error (and let software handle the rest).

Figure 9:
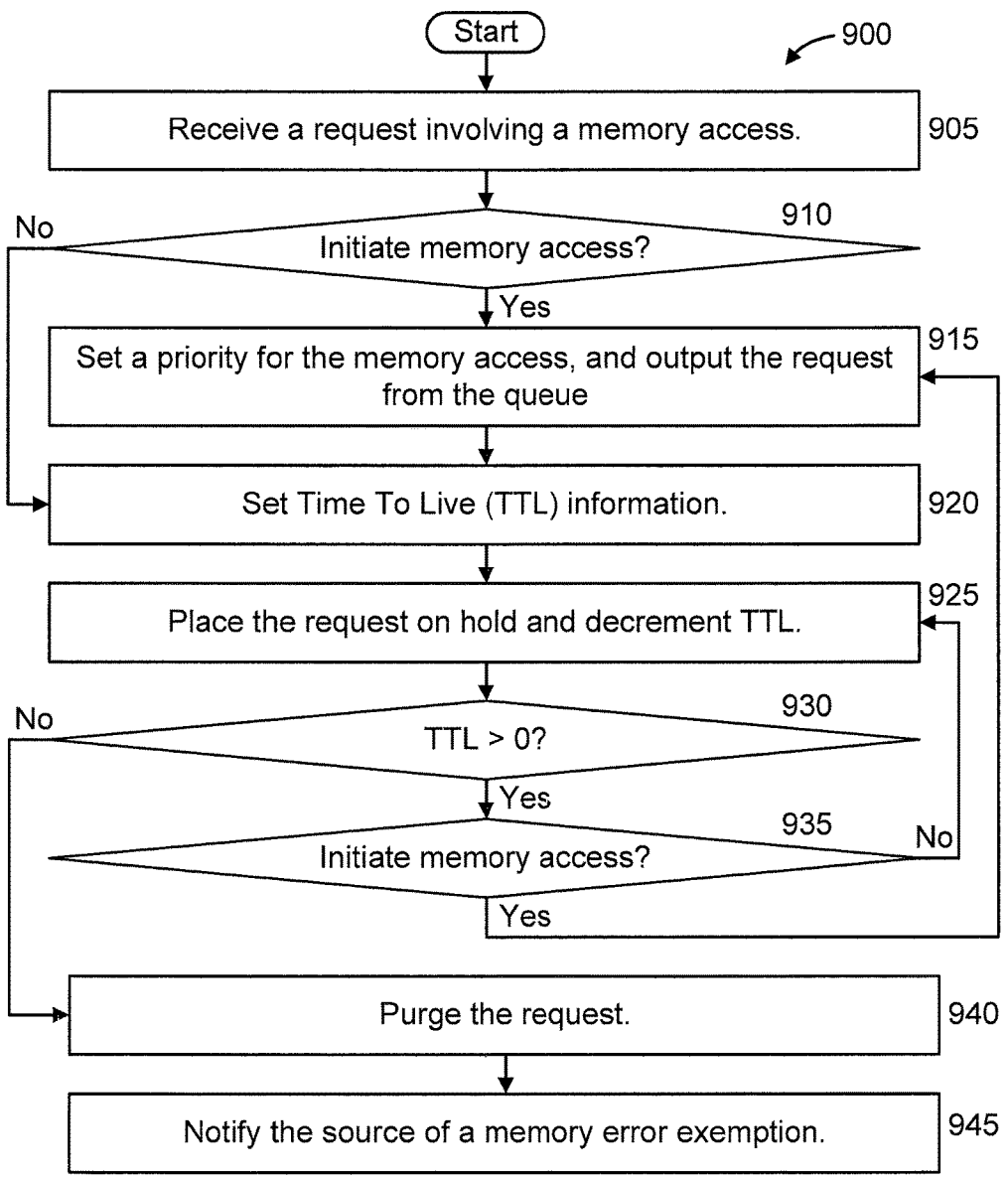
FIG. 9 shows an exemplary method for the control of the wait queues for shared memory access, in accordance with an embodiment of the present invention.

FIG. 9 shows an exemplary method 900 for the control of the wait queues for shared memory access, in accordance with an embodiment of the present invention. The method 900 relates to a sample implementation for the read wait queue 311 or the write wait queue 312 of FIG. 3, with hold and purge controls, in accordance with an embodiment of the present invention.

At step 905, receive a request involving a memory access.

At step 910, determine whether to initiate the memory access. If so, then proceed to step 915. Otherwise, proceed to step 920. In an embodiment, the determination of step 910 can be based on table 801 of FIG. 8.

At step 915, set a priority for the memory access, and output the request from the queue.

At step 920, set Time To Live (TTL) information (that is, set a TTL value).

At step 925, place the request on hold.

At step 930, determine whether the TTL information (TTL value) is greater than (>) 0. If so, then proceed to step 935. Otherwise, proceed to step 940.

At step 935, determine whether to initiate the memory access. If so, then proceed to step 915. Otherwise, return to step 925.

At step 940, purge the request.

At step 945, notify the source of a memory error exemption.

Notify the source via interrupt, and so forth, of a memory error exemption when the lock address hit entry is purged unsuccessfully in the wait and initiated queues. This is not needed for the reserved queue, resulting in a significant advantage since no extra notification mechanism (other than standard memory read/write semantics) is needed for both local and remote requests. Handling memory errors in software is a frequent event in paging, and so forth.

When read wait queue 321 or write wait queue 322 becomes "substantially close to full" (where "substantially close to full" refers to any of (i) actually being completely full and (ii) room for only up to one more entry before actually being completely full), the oldest on-hold entry in that queue can be purged. Alternatively, the controller 300 could notify the upper streams to stop sending the request (note that this is a usual design practice in memory networking), but this will affect normal (not lock address hit) memory accesses. Considering that the reason why the queue becomes substantially close to full is something wrong is going on in the lock address list access sequences, purging the oldest on-hold entry seems the preferred approach.

When the read reserved queue 351 becomes "substantially close to full" (where "substantially close to full" refers to any of (i) actually being completely full and (ii) room for only up to one more entry before actually being completely full), the oldest on-hold entry in the queue 351 can be purged.

The read reserved queue 351 allow for better handling of a LLSC (Load Link Store Conditional) beyond conventional weak LLSC implementations. In other words, multiple load links (read reservations) can be accepted until one of them successfully completes the store (write) operation.

In order to avoid extra complications, context switching can be disabled during the paired access (in particular for a reservation, as it is not likely to be needed for messaging).

Standard memory controller design has wait and initiated queues (that could be referred to by other names), so in an embodiment of the present invention only the read reserved queue 351 and the hold mechanism in the wait queue is added by the present invention. Of course, as readily appreciated by one of ordinary skill in the art, the specific implementation used depends on memory controller design to which the present invention is applied.

Figure 10:
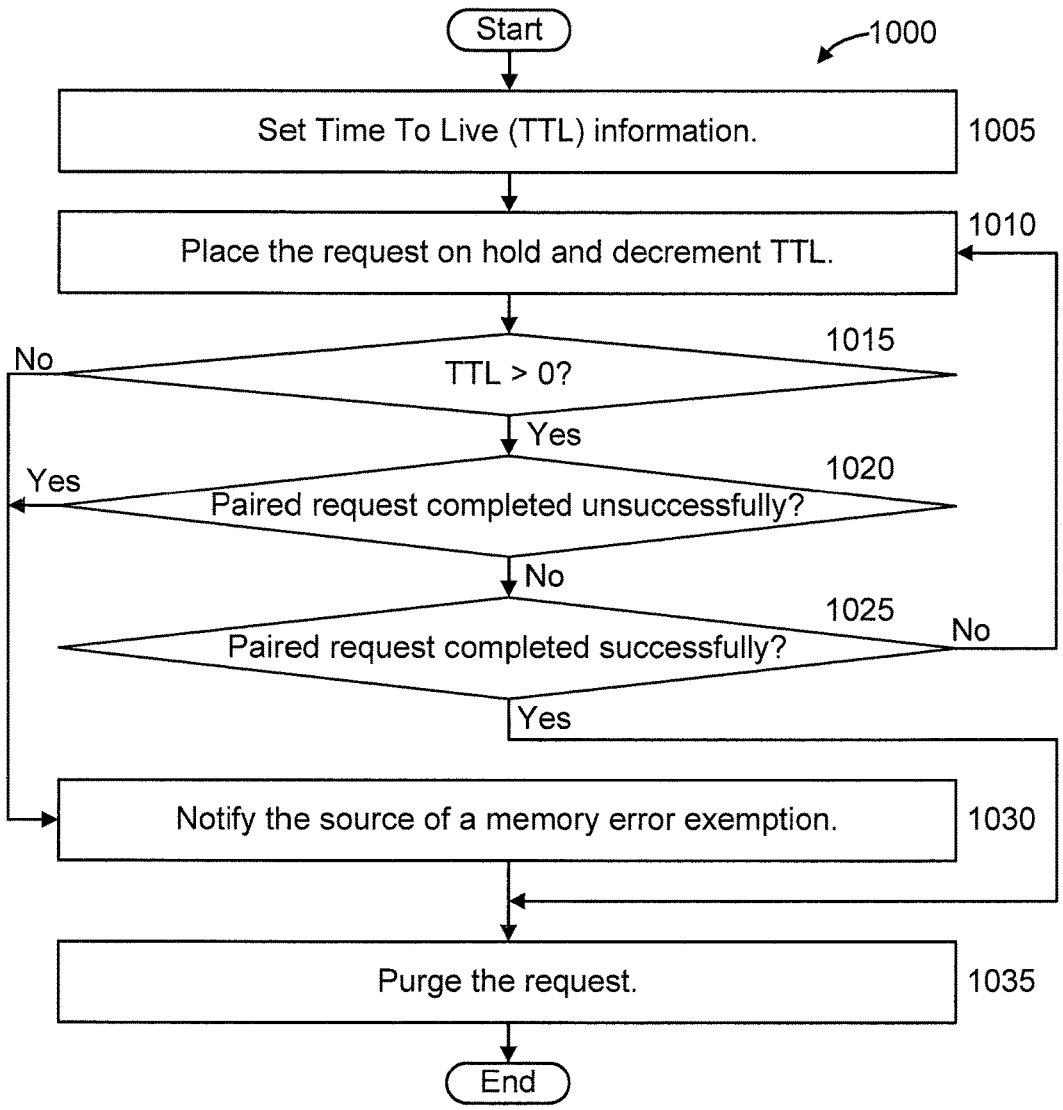
FIG. 10 shows an exemplary method for the control of the read reserved queue for shared memory access, in accordance with an embodiment of the present invention.

FIG. 10 shows an exemplary method 1000 for the control of the read reserved queue for shared memory access, in accordance with an embodiment of the present invention.

At step 1005, set Time To Live (TTL) information.

At step 1010, place the request on hold and decrement TTL.

At step 1015, determine whether the TTL information (TTL value) is greater than (>) 0. If so, then proceed to step 1020. Otherwise, proceed to step 1025.

At step 1020, determine whether the paired request completed unsuccessfully. If so, then proceed to step 1025. Otherwise, proceed to step 1030

At step 1025, determine whether the paired request completed successfully. If so, then proceed to step 1035. Otherwise, return to step 1010.

At step 1030, notify the source of a memory error exception.

At step 1035, purge the entry.

All or part of the control can be implemented in software using an embedded processor in the memory controller for easier update at an expense of the extra latency associated with the software control.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for accessing shared memory objects from local and remote locations by read requests and write requests made to a memory, the method comprising:

configuring a lock address list, having a plurality of slots each associated with a lock bit, to register address locations of the shared memory objects in the memory;

configuring a read wait queue and a write wait queue to selectively input, output, hold, and purge the requests from processor cores and network inputs and outputs;

configuring a read initiated queue and a write initiated queue to selectively input and purge the requests transferred from the read wait queue and the write wait queue, respectively, upon initiation and completion of corresponding accesses to the memory; and configuring a queue controller to control the wait queues using policies by determining which of the requests to output, which of the requests to hold, and which of the requests to purge, based on an entry of the lock address list, a status of a corresponding lock bit and Time To Live information set to each of the requests upon a hold being applied thereto and decremented in each cycle.

2. The computer-implemented method of 1, further comprising configuring a read reserved queue to selectively input, hold and purge the requests transferred from the read initiated queue upon initiation of the shared memory object read accesses and held or purged based on the following write requests and Time To Live information set to each request upon hold and decremented in each cycle.

3. The computer-implemented method of claim 2, further comprising configuring the queue controller to purge a selected on-hold entry in the read reserve queue responsive to the read reserve queue being substantially close to full.

4. The computer-implemented method of claim 2, further comprising configuring the read reserved queue to manage multiple pending Load-Link and Store Conditional (LL/SC) operations by accepting multiple Load-Links until one of the multiple Load-Links successfully completes a store operation.

5. The computer-implemented method of claim 2, further comprising configuring the read reserved queue for use only with first half accesses from among the first half accesses and corresponding second half accesses in the lock address list.

6. The computer-implemented method of claim 1, further comprising configuring the queue controller to purge a selected on-hold entry in one of the wait queues responsive to the one of the wait queues being substantially close to full.

7. The computer-implemented method of claim 1, further comprising configuring the queue controller to notify one or more upper streams to cease sending further requests responsive to one of the wait queues being substantially close to full.

* * * * *